United States Patent [19]

Higham

[11] 4,000,402
[45] Dec. 28, 1976

[54] SCANNING GAUGE CONTROL FOR SHEET PROCESSING APPARATUS

[75] Inventor: John D. Higham, Menlo Park, Calif.

[73] Assignee: Measurex Corporation, Cupertino, Calif.

[22] Filed: June 10, 1974

[21] Appl. No.: 477,762

[52] U.S. Cl. .......................... 235/151.1; 425/141; 235/151.35

[51] Int. Cl. ........................................ G01n 25/56

[58] Field of Search ..... 235/151.35, 151.3, 151.32, 235/151.1; 425/141

[56] References Cited

UNITED STATES PATENTS

| | | | |
|---|---|---|---|
| 3,307,215 | 3/1967 | Gerhard et al. | 425/141 |
| 3,610,899 | 10/1971 | Dahlin | 235/151.35 |
| 3,612,839 | 10/1971 | Dewitt | 235/151.35 |

*Primary Examiner* — Eugene G. Botz
*Attorney, Agent, or Firm* — Owen, Wickersham & Erickson

[57] ABSTRACT

A method and apparatus for controlling the machine direction variations of a property or properties of a sheet material being processed. A scanning gauge moved back and forth across the sheet material as it is moved in the machine direction, takes measurements of the property being controlled at fixed intervals across the sheet and a true profile is computed from the measurements made. At the end of each scan of the gauge the average of all the true profile points is computed. A control variable affecting the sheet property is manipulated so as to maintain the machine direction property of the sheet at some target value as a function of the array of values comprising the true profile, the gauge readings of the sheet property and the true profile average.

5 Claims, 7 Drawing Figures

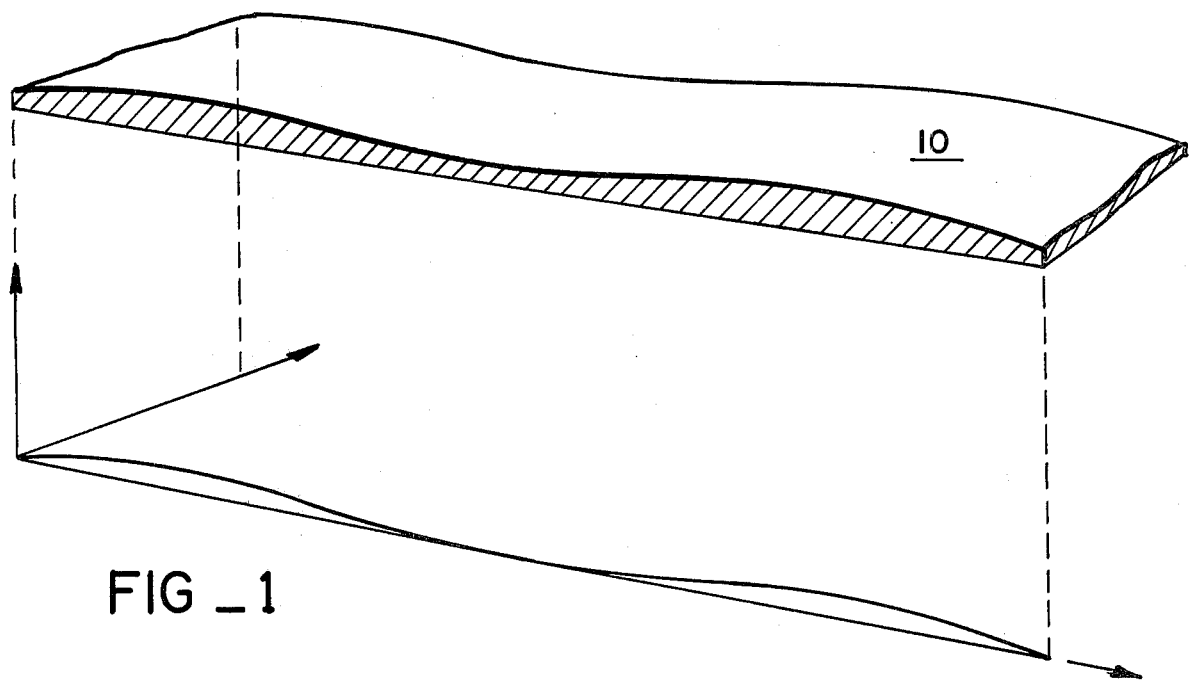
FIG_1
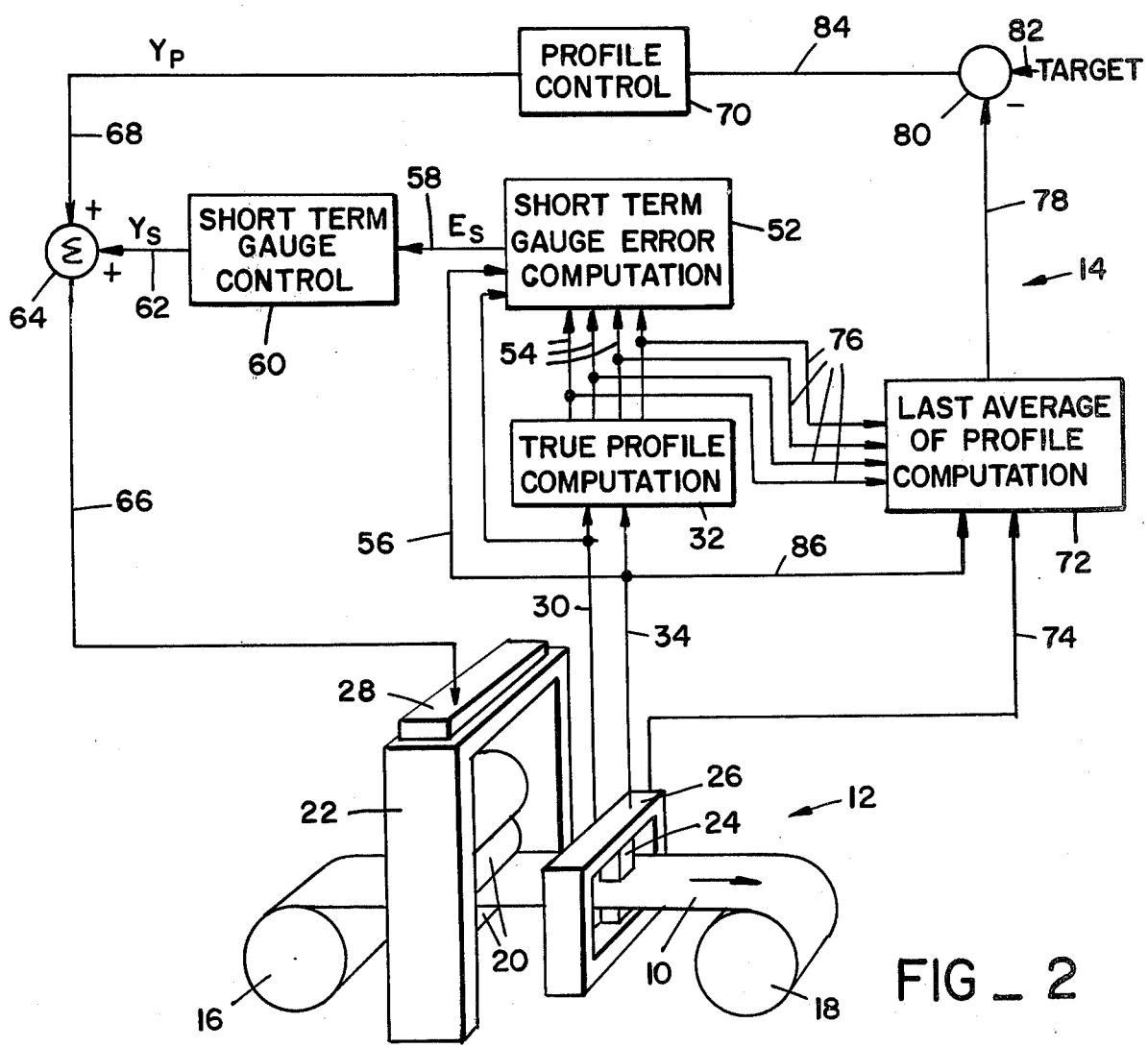
FIG_2

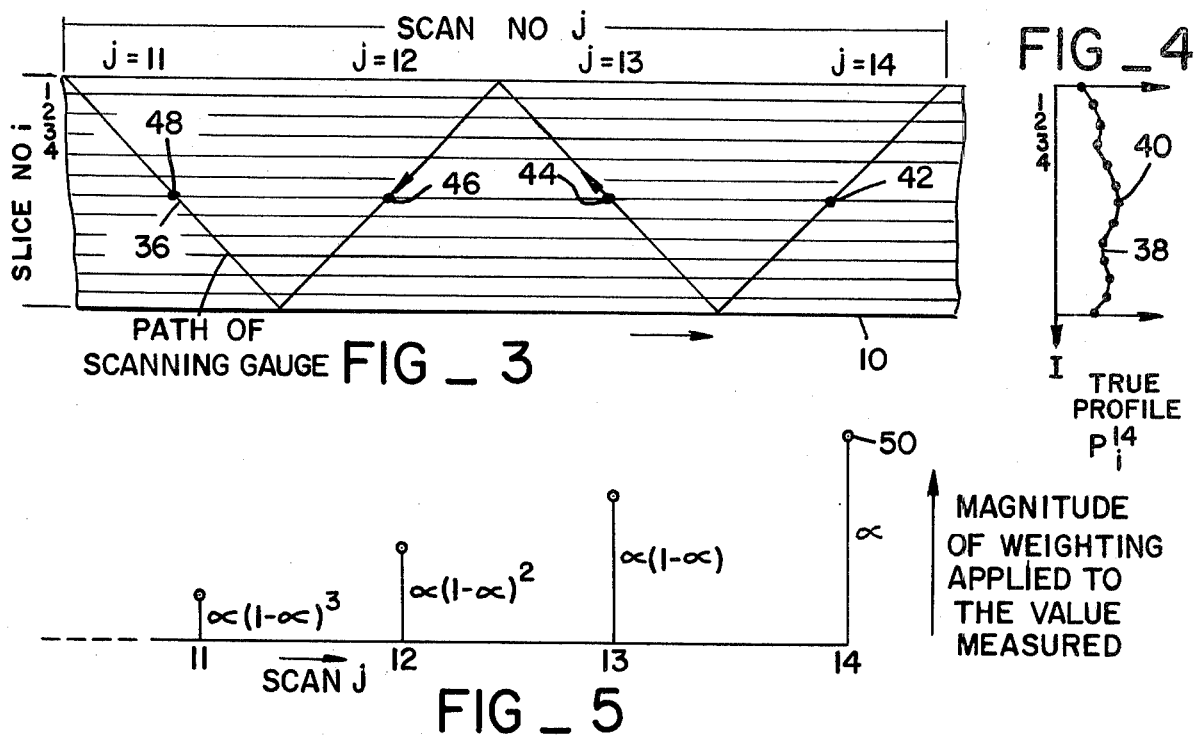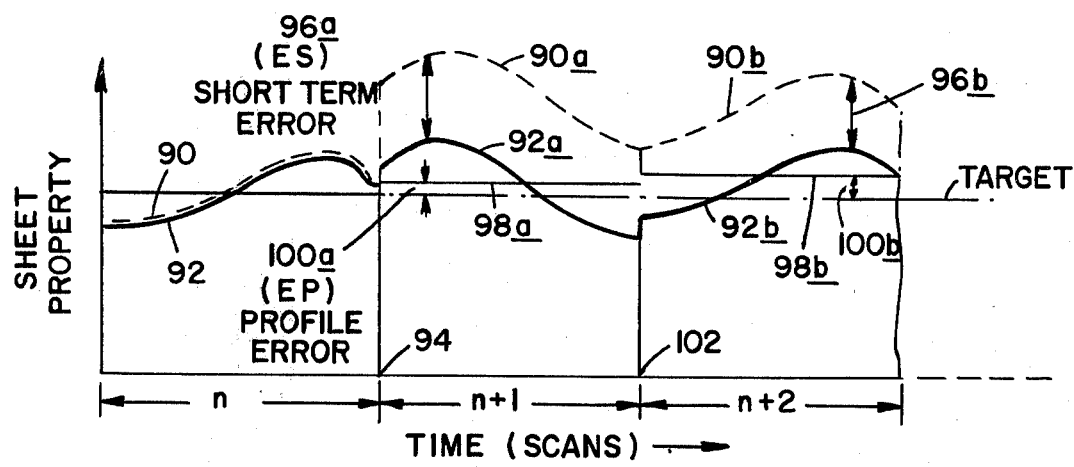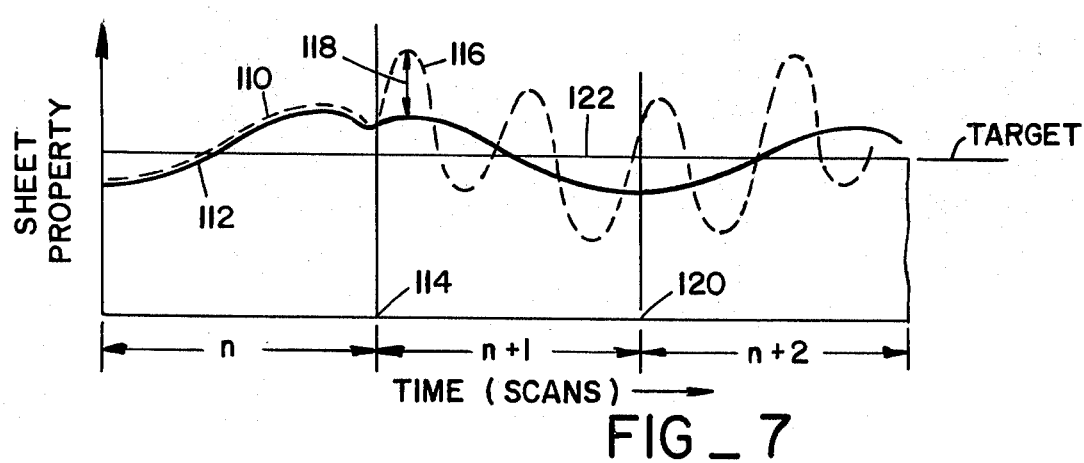

SCANNING GAUGE CONTROL FOR SHEET PROCESSING APPARATUS

FIELD OF THE INVENTION

This invention relates to methods and apparatus for controlling one or more properties in the production of a sheet material as it is being moved linearly, such as for controlling the thickness of sheet material being rolled in a rolling mill.

BACKGROUND OF THE INVENTION

In processes for the production of sheet material such as cold metal rolling or rubber calendering, it is desirable to control or maintain one or more properties of the material. For example, in the rolling of metal the objective is to form a continuous sheet or foil having a uniform thickness. The property to be controlled, as in the case of thickness, may vary in both a machine direction MD (the direction of sheet travel) as well as the cross or transverse direction on the sheet. Variations in the machine direction are commonly held constant by use of a feedback control system comprising a gauge located at a fixed point to measure the sheet property and a means to compare this property with a target value to generate an error signal. A feedback controller is used to convert the error signal into an appropriate means for driving a control variable on the process which affects the property in the machine direction only, in such a way that the sheet property will be held at a target value. In the case of metal rolling this control variable may be a screwdown or hydraulic mechanism controlling the distance between and/or force exerted by the pressure rolls, commonly referred to as the roll gap position.

In a digital feedback control system where the time delay from the control variable change to a resulting change in measurement is short (e.g. one half second), it is desirable, for good feedback control of machine direction variations, to take gauge readings of the sheet property at least at that frequency and preferably at a higher frequency (e.g. one fourth to one fiftieth second). For a system which requires a scanning gauge that traverses the sheet to give information on cross direction variations of the sheet property, it was heretofore necessary to provide a separate gauge mounted at a fixed point over the sheet to give the required frequency of reading for feedback control. Otherwise, the gauge readings would indicate a combination of machine direction variations and cross direction variations. An alternate method was to take control action only at the end of each transverse scan of the sheet, using the average value of the property across the sheet. The procedure was suitable in some sheet processes such as paper making machines where the time delay referred to above is typically 90 seconds and the scan time is about 30 seconds. However, in other sheet processes such as metal rolling where the time delay was less than one half second and the scanning time six seconds, a fixed gauge was heretofore necessary to give a measurement of machine direction variations each time the gauge was read to provide for effective feedback control.

One general object of the present invention is to provide a method in a sheet production process for separating the machine direction variations from the cross direction variations on a gauge scanning back and forth across the sheet, thereby allowing one simple gauge to perform the scanning function and yield a measure of the machine direction variation for control at the required high frequency, i.e. each time a gauge reading is made.

Another object of the present invention is to provide an apparatus for implementing the aforesaid method in an efficient and reliable manner.

Yet another object of the present invention is to provide a method for controlling a property of a continuous sheet material in a production process wherein the aforesaid property in the cross direction profile changes slowly compared to the variations in the machine direction.

A more specific object of the present invention is to provide a method for controlling the property of a sheet material in production wherein a constantly updated best estimate of the cross direction profile is maintained in a memory storage as the gauge which measures the property scans back and forth across the moving sheet. Any instantaneous deviation of the gauge reading which differs from the profile is assumed to be caused by a machine direction change in the property, and differences which persist for each scan at a particular point on the profile are assumed to be due to genuine slow profile changes and are incorporated into the slowly changing profile record kept in the memory device. An average of the profile points across the sheet is computed for each scan of the gauge and a control variable affecting the sheet property is activated in response to control signals produced periodically during each scan as a function of the profile values and the instantaneous gauge readings at various intervals on the sheet and the true profile average.

Still another object of the present invention is to provide an apparatus for controlling one or more properties of a sheet material in production that can utilize a standard scanning type measuring gauge and digital computing and memory storage facilities and moreover an apparatus which is reliable, and relatively easy to install, operate and maintain.

BRIEF SUMMARY OF THE INVENTION

The aforesaid and other important objects of the invention are accomplished by an arrangement for a sheet processing apparatus wherein the sheet being formed and controlled is attached to and extends between payoff and takeup reels. A gauge located near the payoff reel is mounted on a scanning mechanism which carries the gauge back and forth. The machine direction property of the sheet material can be controlled by some suitable means on the sheet processing apparatus such as the pressure rolls in the case of a rolling mill and there is a time delay from the rolls to the point where the property is measured.

As the gauge scans across the sheet it takes a series of measurements at spaced apart "slice" intervals across the sheet which is moving in the machine direction. These measurements are furnished to a computer function block which computes a so-called true profile of the sheet property for each slice position on the sheet. At the end of each scan the average of all the true profile points is computed to produce a true profile average. The effect of this computation is to exponentially "weight" previous readings at that slice position so that the older the reading, the less effect it has on the current value of the true profile.

A short term gauge error computation is calculated each time a gauge reading is made by taking the value of the true profile at that gauge position and subtracting th actual gauge reading. This error signal is then passed to a control function means where it is combined with the true profile average to provide an output signal for activating a control variable on the sheet processing apparatus. For example, the output signal may control the pressure rolls on a metal rolling mill.

Other objects, advantages and features of my invention will become apparent from the following detailed disclosure of one embodiment thereof presented with the accompanying drawings in accordance with 35 U.S.C. 112.

BRIEF DESCRIPTION OF THE DRAWING

FIG. 1 is a schematic representation of a typical sheet material having thickness variations in the cross direction and in the machine direction;

FIG. 2 is a schematic and block diagram of a scanning gauge control system for a rolling mill according to the present invention;

FIG. 3 is a diagrammatic plan view of a portion of moving sheet material showing the path of a scanning gauge across the material;

FIG. 4 is a typical diagrammatic representation of the true thickness profile of the sheet material represented in FIG. 3 for one scan;

FIG. 5 illustrates the exponential weighting of previous values at a particular slice location;

FIG. 6 is a diagram showing the typical fluctuation of a sheet property during a series of scans and the effects of a step change in sheet property in accordance with the invention; and FIG. 7 is a diagram similar to FIG. 6 showing the effects of the control system according to the invention during a sinusoidal high frequency variation in sheet property.

DETAILED DESCRIPTION OF EMBODIMENT

The method steps and one form of apparatus embodying the principles of the present invention will now be described in detail with specific reference to controlling the thickness of metal in a rolling mill. However, as will become readily apparent the invention is equally applicable to the control of other sheet properties for different sheet materials such as paper or rubber. FIG. 1 is presented to show, in an exaggerated manner schematically, how a sheet 10 of metal to be rolled typically has thickness variations in its lengthwise or machine direction as well as in its transverse or cross direction. These variations may be random or repetitive in either one or both directions and in order to produce accurate results in the rolling process for producing sheet material of uniform thickness they must be taken into account.

A typical rolling mill 12 together with a control system 14 is shown in FIG. 2 embodying the principles of the present invention. As illustrated, the sheet 10, supported between a payoff reel 16 and a takeup reel 18, is rolled between a pair of pressure rolls 20 supported in a stand 22, as in a metal rolling mill. A gauge 24 for measuring the sheet property is mounted on a suitable scanning support mechanism 26 which carries the gauge back and forth across the sheet 10. The machine direction property or thickness of the sheet can be varied in this case by controlling the pressure between the rolls 20 using a conventional pressure control device, which is shown symbolically and designed by numeral 28. A time delay from the rolls to the point at which the property may be readily measured is computed using the speed of the sheet material in the machine direction. For thickness measurements the gauge 24 may be of the non-contacting radiation type utilizing either an X-ray or nuclear isotope radiation source. One form of such a gauge is shown in U.S. Pat. No. 3,757,122.

As the gauge 24 moves across the sheet, signals from it related to the property being measured (e.g. sheet thickness) are sent via a lead 30 to a function block 32. Simultaneously, another lead 34 carries signals from a suitable means in the gauge scanning mechanism which indicates the particular "slice" position $i$ of the gauge 24 across the sheet 10. These slices of the sheet are parallel, longitudinally extending lines that are equally spaced apart across the sheet and provide a means for locating and defining areas on it. Thus, at each slice interval, the function block 32 takes the gauge reading from lead 30 and the position signal in lead 34 and computes a new value of what will hereinafter be called the "true profile" for each particular gauge position on the sheet. This valve may be stated mathematically as $$P_i^j = (1 - \alpha) P_i^{j-1} + \alpha X_i^j \quad (1)$$

where $P_i^j$ is the true profile value at scan j, slice position $i$ across the sheet $X_i^j$ is the gauge reading at scan j, slice position $i$ across the sheet $\alpha$ is a filter factor ($0 < \alpha < 1$)

The aforesaid relationship is illustrated graphically in FIG. 3 which shows the plan view of a sheet 10 divided into numbered slices $i$ and showing the path 36 that a scanning gauge would take across its surface. A typical thickness profile generated by a single scan of the gauge, is shown in FIG. 4 by the plot designated as numeral 38 for $j = 14$, i.e. at the end of the 14th scan. The effect of the computation of equation (1) is to exponentially "weight" previous readings at each slice position so that the older reading, the less effect it has on the correct value of the time profile. For example, in FIG. 4 the value of the true profile at the slice position 3, designated by the numeral 40, is a weighted sum of previous readings taken at locations on the sheet designated in FIG. 3 as 42, 44, 46 and 48 at that point on the sheet.

This "weighting" relationship is illustrated in FIG. 5. The reading at 42 has the largest weight $\alpha$, designated in FIG. 5 by numeral 50 since it is the most recent measurement made. Accordingly, the reading of FIG. 3 has a smaller weight $\alpha (1 - \alpha)$, the reading 46 an even smaller one and so on. This method of weight averaging as heretofore used for sheet measurement is fully described in U.S. Pat. No. 3,610,899.

The computation in function block 32 occurs after each gauge reading, and thus its output during one scan is a set of I values of the true profile at each point across the sheet, as shown in FIG. 4.

A short term gauge error computation is calculated by a function block 52 each time a gauge reading is made. This block takes the value of the profile $P_i^j$ at that gauge position $i$ from the block 32 on a series of leads 54, and it subtracts the actual gauge reading supplied from the gauge via a lead 56 to produce a short term error $E_s$. Mathematically this can be expressed as $$E_s = P_i^j - X_i^j \quad (2)$$

This computation occurs at the same frequency and immediately after the computation in the function block 32.

This error signal $E_s$ as an output from the block 52, is supplied on a lead 58 to a short term gauge control function block 60. The output $Y_s$, of this block 60 on a lead 62 is a requested change to a block 64 which provides a setpoint on a lead 66 for the control means 28 for varying the sheet property in the machine direction. The block 64 is a summing function which can be expressed as $$Y_o = Y_p + Y_s \qquad (3)$$

where $Y_o$ is the output on lead 66, $Y_s$ is the input on lead 62 and $Y_p$ is an input on a lead 68 from a profile control block 70. The computation of functional block 64 is done immediately after that of block 60. The profile control function 70 is only computed once per scan. At other times the signal $Y_p$ on lead 68 is zero.

Using Z-Transform notation, the function 60 will typically be of the general form $$\frac{Y_s(Z)}{E_s(Z)} = \frac{a_o + a_1 z^{-1} + a_2 z^{-2} + \ldots a_N z^{-N}}{1 + b_1 z^{-1} + b_2 z^{-2} + \ldots b_M z^{-M}} \qquad (4)$$

The values of the coefficients $a$ and $b$ in equation (4) will be chosen according to the dynamic response between the control means 28 and the measurement of the sheet property at the gauge 24. A typical method for choosing the coefficients is given by applicant in an article in the periodical "Control" for February 1968. In many cases the function (4) will be as simple as $$Y_s(a)/E_s(z) = a_o \qquad (5)$$

which is the digital equivalent of integral feedback control commonly used in the process industries, or $$F(z) = a_o + a_1 z^{-1} \qquad (6)$$

which is the digital equivalent of proportional-plus-integral control used in process industries.

The function achieved by the combination of block 32, block 52 and block 60 is to correct the short term deviations of the instantaneous value of the gauge reading from the profile of the sheet. However, the profile of the sheet is constantly changing according to equation (1), and therefore it is necessary to fix the sheet profile at some desired value. This may be done by holding the average value of the profile at a constant value, or a fixed point on the profile at a constant value.

Control of Sheet Average at Constant Value

A last average of profile computation is provided by a function block 72, as shown in FIG. 2. A signal on a lead 74 is supplied from the scan mechanism to initiate a calculation by block 72 at the end of each scan of the sheet. This calculation in block 72 takes the average of all the values of the true profile at each slice position $i$ supplied on a series of leads 76 and produces an average value on an output lead 78. Mathematically this output, the signal profile average $P_a^j$, may be expressed as $$P_a^j = \sum_{i=1}^{I} P_i^j \qquad (7)$$

The signal profile average $P_a^j$ is supplied on lead 78 to a subtraction function 80 where it is subtracted from a preset target value T preselected by the mill operator and supplied on a lead 82. The subtraction function produces a profile error signal $E_p$ on an output lead 84. Mathematically this can be expressed as $$E_p = T - P_a^j \qquad (8)$$

The error signal $E_p$ on lead 84 is then processed by the profile control function 70 which produces an output $Y_p$ on lead 68 that is added into the summing block 64. The output from the summing block, furnished via lead 66, causes an appropriate change in the control mechanism 28 for varying the sheet property in the machine direction such as the pressure rolls 20 in a rolling mill.

The profile control function 70 is usually of the same form as equation (5) which represents simple integral control, since the function only operates once every scan. Hence, mathematically the form of function 70 is $$Y_p = a_o \cdot E_p \qquad (9)$$

where $a_o$ is a constant. Function 70 computed immediately following the computation by the subtraction function 80.

Control of a Point on the Sheet at Constant Value

In an alternative form of the invention, assume that it is required to keep a certain point on the sheet at slice $i = k$ constant in the machine direction, for example the center of the sheet. In this case, the computation in the last average function 72 is modified as follows. Using a lead 86 connected to the slice position indicator lead 34, a signal is provided to function 72 when slice k has been reached. The function 72 then takes the true profile value computed in function 32 corresponding to slice k from leads 76 and produces an output equal to that value on lead 78. This latter value will be $P_k^j$ from the true profile function 32. From then on the computation proceeds as described before in equations (8) and (9).

The present invention is more applicable where the cross direction profile of the sheet material being processed varies slowly compared to the scan period of the scanning gauge, and thus the choice of the filter factor $\alpha$ can be important. The smaller the value of the filter factor $\alpha$ then the longer it will take for the true profile computation (1) in function 32 to reflect, a true change in profile when it does occur. However, the larger the value of $\alpha$, the more pure variations of the property being controlled in the machine direction will contaminate the true profile computation. The filter factor $\alpha$ is therefore a parameter chosen to provide a best compromise on a particular process. It may be alternatively expressed as a time constant $\tau$ $$\tau = [T/\log_e (1 - \alpha)]$$

where T is the time to scan the sheet.

Referring to FIG. 3, $\tau$ represents the time for the weighting of a reading to drop to 36.6% of its initial weighting.

The initial conditions of the sheet material can also be important to the invention. When the scanning gauge 24 first begins to read values on the sheet the values $P_i^j$ of the profile will not reflect the profile of the sheet. Therefore on the first scan of the gauge across the sheet, the computation of the true profile in function 32 is changed such that the new gauge readings are used as initial values of the profile. That is to say $$P_i^j = X_i^j \tag{10}$$

In addition, the control action of the short term gauge control block 60 is delayed N scans until a reasonably accurate profile has been established. Typically $$N = (2\tau/T) \tag{11}$$

There is no necessity to delay the computation of the profile control by function 70.

The principles of the present invention in operation may be described with reference to the examples in FIGS. 6 and 7. These diagrams illustrate the effect of the system of FIG. 2 in open loop mode, that is with lead 66 disconnected and hence no feedback action being taken. Essentially, each diagram is a plot showing the fluctuations of the sheet property being measured with respect to time subdivided in terms of scans $n$, $n+1$, $n+2$ etc. In FIG. 6 it is assumed that the sheet property and the sheet profile have not changed for some time and the gauge reading provided on lead 30 in FIG. 2 and designated by the dotted line 90 in FIG. 6 coincides with the true profile plot 92, furnished by the lead 54 in FIG. 2. At the end of scan $n$, a point 94 in time, there is a step increase in the machine direction value of the property. Hence the gauge reading 90a now follows the same shape as the profile 92a of the next scan $n+1$, but at a higher value. The computation of true profile by block 32 in FIG. 2 produces the new profile 92a and the computation of the short term gauge error block 52 produces the short term error $E_s$, designated by numeral 96a. It may be noted that the profiles 92 and 92a are reversed because the gauge is travelling in alternate directions across the sheet. (See FIG. 3). At the end of each scan the block 72 computes the profile average 98a and the block 80 of FIG. 2 produces the profile error $E_p$ designated by numeral 100a. On the next scan ($n+2$) it can be seen that the short term error 96b between the gauge reading line 90b and the true profile line 92b is smaller and the profile error 100b is longer. It can also be seen that the sum of the $E_p$ and $E_s$ is equal to the total increase in the machine property. The advantage of the invention in this case is that at point in time 94 in FIG. 6 the majority of the machine direction property increase is detected via the short term error $E_s$ 96a. In FIG. 2 rapid control action can be taken by the short term gauge control block 60. If control action is taken only at the end of every scan then no action would be detected or taken until the end of scan $n+1$, which point in time is designated by numeral 102 in FIG. 6. This would mean that an incorrect value of the sheet property would exist for a whole scan of the sheet without corrective action being taken.

FIG. 7 illustrates the operation of the invention when there is a high frequency sinusoidal variation in the sheet property in the machine direction. Again, it is assumed that the system of FIG. 2 is open loop, that the machine direction variations have been zero and the cross direction variations have been constant for some time for the sheet material being processed. In this situation, the instantaneous gauge readings designated by the dotted line and numeral 110 for scan $n$ coincide with the true profile, designated by numeral 112. At point in time 114 a sinusoidal variation in machine direction begins, as indicated by dotted line 116. Now, in response to this, the block 52 of FIG. 2 generates a short term error, designated by numeral 118 which could be acted on by block 60 to control the variation, if lead 66 was connected. At point in time 120 in FIG. 6 it will be seen that the profile average 122 is substantially unchanged and therefore the profile error $E_p$ generated by block 80 will be substantially zero. This illustrates how the invention enables short term variations to be detected in the block 52 and acted on in block 60. If control action was only initiated at the end of each scan these rapid sinusoidal variations would average to zero or near zero and no effective control action could be taken. Thus the invention enables machine direction variations of high frequency to be detected and controlled.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a method for controlling the machine direction variations of a property or properties of a sheet process the steps of
   a. taking readings of the property or properties of the sheet from a scanning gauge at fixed longitudinal intervals or slices across a sheet as the sheet is moving at a constant linear rate;
   b. computing a true profile from current and previous readings made by the gauge at each of said intervals across the sheet;
   c. computing the average of all the true profile points at the end of each scan to produce a true profile average value;
   d. generating a short term error signal as the difference between the actual gauge reading and the corresponding true profile value;
   e. using said short term error signal to produce a correction signal for controlling a variable or variables affecting said sheet property or properties;
   f. generating a profile error signal from the difference between the average of the true profile and a target value; and
   g. summing together said short term error signals and said profile error signals to simultaneously manipulate a control variable or variables affecting the property or properties of said sheet material.

2. The method of claim 1 wherein said true profile at each said interval or slice is computed mathematically according to the formula $$P_i^j = (1-\alpha) P_i^{j-1} + \alpha X_i^j$$

where $P_i^j$ is the true profile value at scan $j$, slice position $i$ across the sheet $X_i^j$ is the gauge reading at scan $j$, slice position $i$ across the sheet $\alpha$ is a filter factor ($0 < \alpha < 1$).

3. The method of claim 1 wherein said short term error signal is represented mathematically as $$E_s = P_i^j - x_i^j$$

where $P_i^j$ is the true profile value at scan $j$, slice position $i$ across the sheet, and $X_i^j$ is the gauge reading at scan $j$ slice position $i$ across the sheet.

4. The method of claim 1 wherein said profile error signal is represented mathematically as $$E_v = T - P_a^j$$

where $T$ is the target value, and
$P_a^j$ is the signal profile average.

5. In a method for controlling the machine direction variations of a property or properties of a sheet process the steps of a. taking readings of the property or properties of the sheet from a scanning gauge at fixed longitudinal intervals or slices across a sheet as the sheet is moving at a constant linear rate;

b. computing a true profile from current and previous readings made by the gauge at each of said intervals across the sheet;

c. computing the average of all the true profile points at the end of each scan to produce a true profile average value;

d. generating a short term error signal as the difference between the actual scanning gauge reading and the corresponding true profile value; and e. using said short term error signal to produce a correction signal for controlling a variable or variables affecting said sheet property or properties.

* * * * *